United States Patent [19]

Green et al.

[11] Patent Number: 5,672,675
[45] Date of Patent: Sep. 30, 1997

[54] VINYL ETHER-TERMINATED POLYESTER OLIGOMER STABILIZERS FOR VINYL ETHER-BASED COATING SYSTEMS

[75] Inventors: George David Green, Cary; James Ronald Snyder, Chicago; Raymond John Swedo, Mt. Prospect, all of Ill.

[73] Assignee: AlliedSignal, Inc., Morris Township, N.J.

[21] Appl. No.: 630,188

[22] Filed: Apr. 10, 1996

Related U.S. Application Data

[63] Continuation-in-part of Ser. No. 274,671, Jul. 13, 1994, Pat. No. 5,514,727.

[51] Int. Cl.$^6$ .............. C08G 63/137; C08F 2/50; C08L 67/07
[52] U.S. Cl. ............. 528/307; 522/75; 522/179; 522/181; 522/93; 522/96; 522/97
[58] Field of Search .............. 528/307; 522/93, 522/96, 97, 179, 181

[56] References Cited

U.S. PATENT DOCUMENTS

| | | | |
|---|---|---|---|
| 4,156,035 | 5/1979 | Tsao et al. | 427/44 |
| 4,472,019 | 9/1984 | Bishop et al. | 350/96.3 |
| 4,902,727 | 2/1990 | Aoki et al. | 522/90 |
| 4,908,297 | 3/1990 | Head et al. | 430/284 |
| 4,932,750 | 6/1990 | Ansel et al. | 350/96.34 |
| 4,971,424 | 11/1990 | Babirad et al. | 350/96.34 |
| 4,999,216 | 3/1991 | Gaske et al. | 427/44 |
| 5,045,572 | 9/1991 | Plotkin et al. | 522/31 |
| 5,139,872 | 8/1992 | Lapin et al. | 428/375 |
| 5,286,835 | 2/1994 | Green et al. | 528/272 |

FOREIGN PATENT DOCUMENTS

WO90/10660  3/1990  WIPO.

OTHER PUBLICATIONS

Decker et al. "Photodegradation of UV–cured Coatings II. Polyurethane–Acrylate–Networks, Journal of Polymer Science", vol. 29, 739–747 (1991).

*Primary Examiner*—Susan W. Berman
*Attorney, Agent, or Firm*—Kyle K. Kappes; Roger Criss; Harold Wells

[57] ABSTRACT

Oligomers of particular usefulness in coatings are vinyl ether terminated polyester oligomers which include 4,8-bis (hydroxymethyl) tricyclo[5.2.1.0$^{2,6}$]decane (BHTD).

5 Claims, No Drawings

VINYL ETHER-TERMINATED POLYESTER OLIGOMER STABILIZERS FOR VINYL ETHER-BASED COATING SYSTEMS

CROSS-REFERENCE TO RELATED APPLICATIONS

This is a Continuation-in-Part of U.S. patent application Ser. No. 08/274,671 filed July 13, 1994, now U.S. Pat. No. 5,514,727.

BACKGROUND OF THE INVENTION

This invention relates to protective or decorative vinyl ether-based coatings for wood, metal, paper, glass, and plastics where it is important to maintain properties such as color stability, thermal stability, mechanical stability, hydrolytic stability, and resistance to embrittlement, and to minimize or prevent other properties such as hydrogen generation and blocking. The invention also relates to stabilizers to maintain these properties in such coatings.

An example of a coating to which the instant invention is applicable is an optical fiber coating. Optical fibers are typically coated with a primary coating to cushion against micro-bending and a secondary coating for abrasion resistance. Problems with these coatings include long term stability, hydrogen generation, and "blocking" or fiber—fiber adhesion. Long term stability is important as the intended lifetime of optical fibers is approximately 30 years. Premature failure of the fiber coating cannot be tolerated. It is also important that degradation of the coating does not affect its surface characteristics. This could lead to surface adhesion (blocking) of the coated fibers upon later processing, or fouling of the processing equipment during manufacture. Blocking may also occur after coating because of a change in the surface energy over time. The generation of hydrogen is thought to be due to degradation of the coating resulting in a reduction in light transmission.

It is an object of the present invention to provide vinyl ether-based coatings which contain stabilizers to aid in the maintenance of desirable properties and to minimize undesirable properties. Another object is to provide the stabilizers to aid in tailoring the properties of such coatings.

SUMMARY OF THE INVENTION

The objects of the present invention are provided by a stabilized coating composition comprising a vinyl ether-containing composition polymerizable by actinic, gamma ray, or electron beam radiation comprising: (a) an oligomer or a mixture of oligomers which are monofunctional, multifunctional, or a mixture of both monofunctional and multifunctional and which have a reactive functionality chosen from the group consisting of epoxy, acrylate, vinyl ether, maleate, or mixtures thereof; (b) monomers which are monofunctional, multifunctional, or a mixture of both monofunctional and multifunctional monomers and which have a reactive functionality chosen from the group consisting of epoxy, acrylate, vinyl ether, maleate, or mixtures thereof, wherein at least one of (a) or (b) must contain a vinyl ether functionality; (c) a photoinitiator with an optional sensitizer, said photoinitiator which is chosen from the group consisting of a cationic photoinitiator and a radical photoinitiator; and (d) a thermal oxidation stabilizer. The composition also comprises additives comprising at least one additive chosen from the group consisting of: (e) a hydrogen stabilizer; (f) a light screen; (g) a color stabilizer; (h) a blocking stabilizer or slip agent; and (j) a coupling agent. The oligomers (a) may be polyesters, polyethers, polycarbonates, polyalkylene oxides, polyamides, polyureas, or may comprise urethanes which are the reaction products of (i) a hydroxyl-terminated macropolyol, (ii) a diisocyanate, and (iii) a hydroxy-containing functional group polymerizable by actinic, gamma ray, or electron beam radiation chosen from the group consisting of epoxy, acrylate, vinyl ether, maleate, or mixtures thereof. The reactive functionality of both oligomers and monomers may be a terminal, internal, or pendant.

The objects of the present invention are also provided by additives which may be used individually or as part of a stabilizer package to provide desirable properties to optical fiber coatings. These additives are hydrogen stabilizers, light screens, color stabilizers, blocking stabilizers, and coupling agents, or a stabilizer package comprising a thermal oxidation stabilizer and at least one additive chosen from the group consisting of a hydrogen stabilizer, a light screen, a color stabilizer, a blocking stabilizer, and a coupling agent. The additives may be used to affect the properties of coatings made from polyesters, epoxy mixtures, vinyl ethers, vinyl ether maleates, or coatings made from mixtures of those compounds.

In another aspect, the invention is a family of vinyl ether terminated polyester oligomers which include 4,8-bis (hydroxymethyl)tricyclo[5.2.1.0$^{2,6}$]decane (BHTD). Including BHTD in the oligomeric structure has been found to provide improved physical properties to coatings formulated with such oligomers.

DETAILED DESCRIPTION OF THE INVENTION

The stabilized coating composition comprises a vinyl ether-containing composition polymerizable by actinic, gamma ray, or electron beam radiation comprising oligomers (a), monomers (b), photoinitiator and optional sensitizer (c), and a thermal oxidation stabilizer (d). The composition also comprises additives comprising at least one additive chosen from the group consisting of a hydrogen stabilizer (e), a light screen (f), a color stabilizer (g), a blocking stabilizer (h), and a coupling agent (j). A detailed description of each of these components follows.

Oligomers (a)

Where the oligomers (a) are polyethers, they may be chosen from the group consisting of polyethylene glycol; polypropylene glycol; block or random copolymers of ethylene glycol and propylene glycol; multifunctional phenols which have been derivatized with ethylene oxide, propylene oxide, or random or block copolymers of ethylene and propylene oxides (e.g., 4,4'-isopropylidene diphenol extended with ethylene oxide); and polytetramethylene glycol. Where the oligomer is a polycarbonate, it may be chosen from the group consisting of poly(hexamethylene carbonate), poly(bis-phenol-A carbonate), carbonates derived from multifunctional phenols which have been derivatized with ethylene oxide, propylene oxide, or random or block copolymers of ethylene and propylene oxides. Where the oligomer is a polyalkylene oxide, the oligomer may be chosen from the group consisting of polyethylene oxide, polypropylene oxide, polytetramethylene oxide, and random or block copolymers of thereof.

Where the oligomer comprises a urethane, the hydroxyl-terminated macropolyols (i) used to make the oligomer (a) may be chosen from the group consisting of polyester, polyether, polycarbonate, polyalkylene oxides, and diols of alkylene, arylene, aralkylene and cycloalkylene radicals. An example of the polyester structure is:

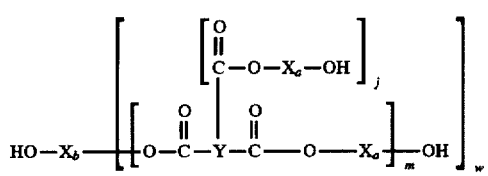

wherein $X_a$, $X_b$, and Y are radicals having a molecular weight of from 25 to about 500, and $X_b$, each $X_a$, and each Y is independently selected from the group consisting of alkylene, arylene, aralkylene and cycloalkylene radicals, j is an integer from 0 to 2, m is an integer from 1 to 100, and w is an integer from 1 to 3. Note that in the instant application, the term "independently selected" means that where them may be more than one variable within brackets which may be substituted, that variable may be selected independently of the same variable within the same brackets, e.g., the two X's in [—O—X—O—]$_2$, may differ from each other.

Examples of the alkylene moieties for $X_a$, $X_b$, and Y which may be used include saturated aliphatic hydrocarbons based upon methylene (>C<), ethylene (>C—C<), propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, and eicosylene as well as unsaturated hydrocarbons such as "ethene" (>C=C<), propene, etc., preferably those alkylene groups, containing up to about 20 carbon atoms. Examples of arylene groups include phenylene, naphthylene, anthrylene, phenanthrylene, etc. Cycloalkylene groups include the cyclopentylene, cyclohexylene, cycloheptylene, cyclooctylene, and cycloalkylene groups containing 1 or more alkyl groups on the nucleus. Similarly, the arylene groups which may be used for Y also may contain one or more alkyl groups on the aromatic ring, especially where such alkyl groups contain up to about 6 carbon atoms. Examples of aralkylene groups include benzylene, 1-phenethylene, 2-phenethylene, 3-phenylpropylene, 2-phenylpropylene, 1-phenylpropylene, etc. Particularly useful Y groups are —(CH$_2$)$_n$— groups where n is 2, 3, or 4, 1,2-, 1,3-, or 1,4-phenylene groups, and 1,4-cyclohexylene groups. Particularly useful X groups are —CH$_2$CH$_2$—, —CH$_2$CH$_2$—O—CH$_2$CH$_2$—, —CH$_2$—(CH$_3$)CH—, —(CH$_2$)$_n$— where n is 4 or 6, —CH$_2$—(CH$_3$)$_2$C— CH$_2$—, 1,4-phenylene, and 1,2-, 1,3-, and 1,4-xylylene.

Preferred structures for $X_a$ and $X_b$ are:

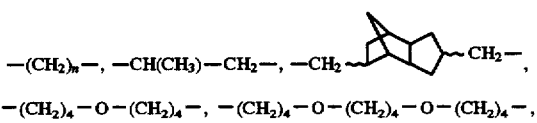

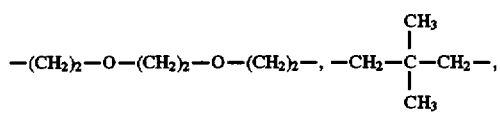

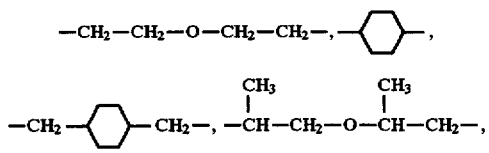

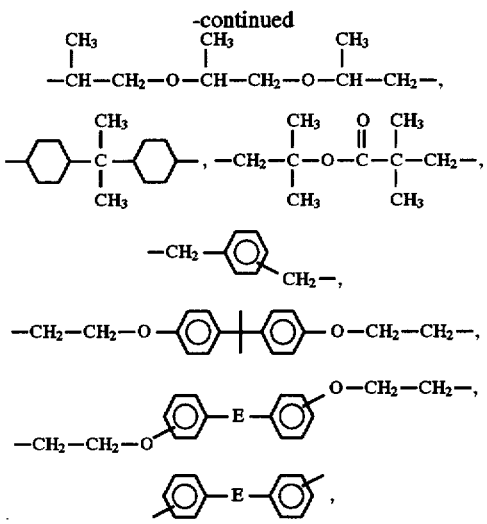

and $X_b$ may additionally be chosen from the group consisting of:

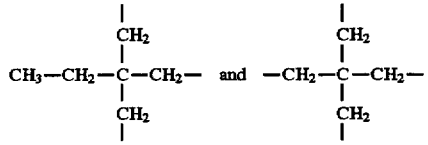

wherein n is an integer between 2 and 20, E is chosen from the group consisting of bond, O, CH$_2$, S, SO$_2$, >C(CH$_3$)$_2$, and >C(CF$_3$)$_2$, and Y is independently selected from the group consisting of:

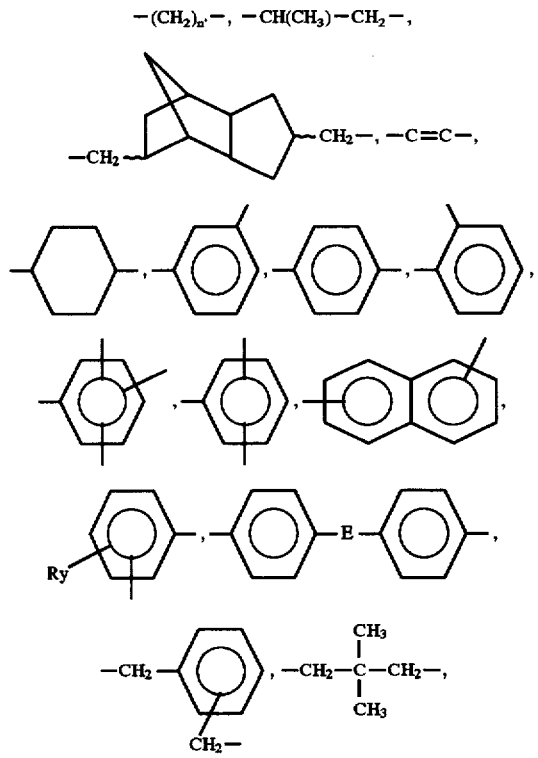

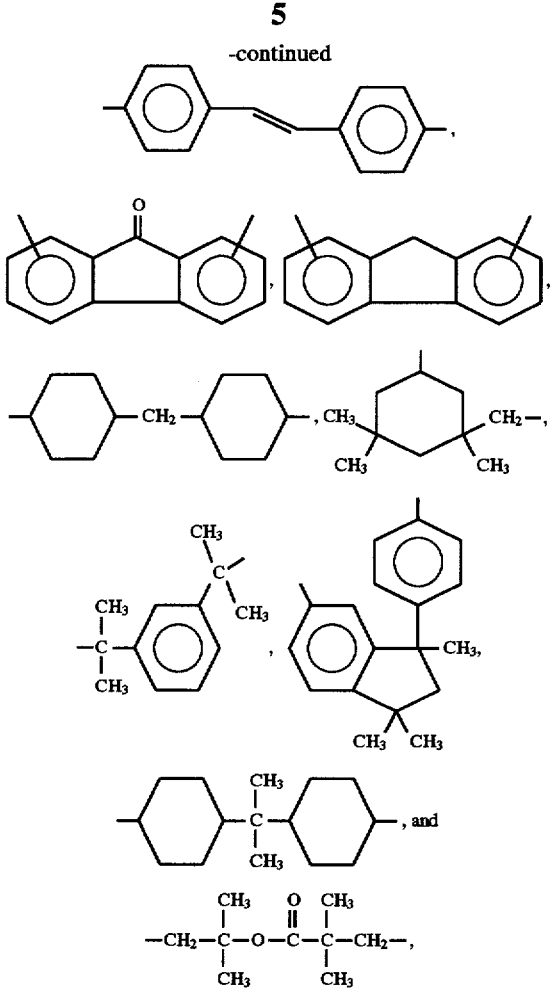

wherein n' is an integer between 2 and 20, E is chosen from the group consisting of bond, O, CH$_2$, S, SO$_2$, >C(CH$_3$)$_2$, and >C(CF$_3$)$_2$, and R$_y$ is chosen from the group consisting of hydrogen, alkyl containing from 1 to 6 carbon atoms, and NO$_2$.

Particularly preferred hydroxyl-terminated polyesters include poly(propylene adipate), poly(neopentyl adipate), poly(1,4-butane adipate), poly(1,6-hexane adipate), poly (neopentyl isophthalate), and poly(1,6-hexane isophthalate). The preferred molecular weights for the polyesters will be about 200 to 5000. Polyesters derived from mixed diols or acids may be useful.

Examples of the macropolyol (i) as a hydroxyl-terminated compound are:

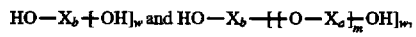

wherein X$_a$ and X$_b$ are radicals having a molecular weight of from 25 to about 500, and each X$_a$ and X$_b$ is independently selected from the group consisting of alkylene, arylene, aralkylene and cycloalkylene radicals, m is an integer from 1 to 100, preferably from 1 to 10, and w is an integer from 1 to 3. Preferred structures for X$_a$ and X$_b$ are the same as those listed for the polyester (i) above.

The diisocyanate (ii) component of the oligomer (a) has the structure:

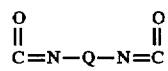

wherein Q is a divalent radical selected from the group consisting of alkylene, arylene, aralkylene, and cycloalkylene radicals.

A broad variety of diisocyanates may be used and may be exemplified by such materials as the toluene diisocyanates (TDI), p- and m-phenylene diisocyanate, 1,4-tetramethylene diisocyanate, 1,6-hexamethylene diisocyanate, 2,2,4-trimethylhexamethylene diisocyanate, 1,4-cyclohexane diisocyanate, 4,4'-dicyclo-hexylmethane diisocyanate (Desmodur W), 4,4'-diphenylmethane diisocyanate (MDI), 3,3'-dimethyl-4,4-diphenylmethane diisocyanate, 1,5-tetrahydronaphthalene diisocyanate, naphthalene-1,5'-diisocyanate, bis(2-methyl-3-isocyanatephenyl)methane, 4,4'-diphenylpropane diisocyanate, tetramethylxylene diisocyanate (TMXDI), isophorone diisocyanate (IPDI).

Polyisocyanates with a functionality of 2 or more may also be utilized. Examples are those discussed in U.S. Pat. No. 4,433,067, especially the polyisocyanates based on methylenediphenyl diisocyanate, in particular, the 4,4'-isomer and the uretonimine modified MDI as described there. The term polyisocyanate also includes quasi prepolymers of polyisocyanates with active hydrogen containing materials where the polyisocyanate is typically reacted with from about 0.05 to about 0.3 equivalents of a polyol. Although a vast number of polyisocyanates are suitable, in practice polyisocyanates based on MDI and TDI may be preferred for economy and general availability. However, aliphatic isocyanates exhibit non-yellowing properties which are especially important for coatings.

Among the most desirable isocyanates are 4,4'-diphenylmethane diisocyanate, toluene diisocyanate, isophorone diisocyanate, m-tetramethylxylene diisocyanate, 4,4'-dicyclohexylmethane diisocyanate (Desmodur W), and 1,6-hexamethylene diisocyanate.

Preferred structures for Q are:

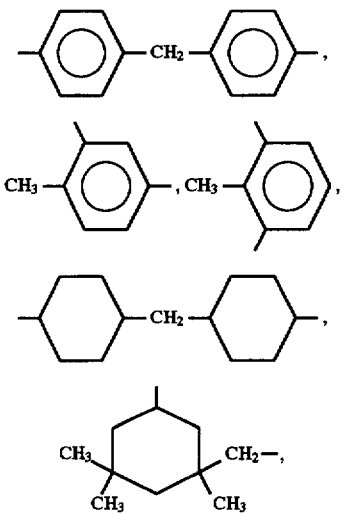

-continued

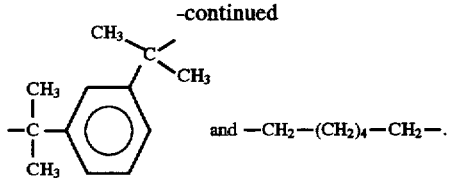

and $-CH_2-(CH_2)_4-CH_2-$.

The hydroxy-containing functional group polymerizable by actinic, gamma ray, or electron beam radiation (iii) is chosen from the group consisting of epoxy, acrylate, vinyl ether, maleate, or mixtures thereof. Examples of hydroxyl-functionalized epoxides are 1-hydroxy-2,3-epoxy propane and hydroxymethylcyclohexane-3,4-oxide. Examples of hydroxy-functionalized acrylates are hydroxyethyl acrylate, hydroxypropyl acrylate, and other hydroxyalkyl acrylates. Examples of hydroxy-functionalized maleates are bis-hydroxyethyl maleate and other bis-hydroxylalkyl maleates, methyl-2-hydroxymethyl maleate, ethyl-2-hydroxymethyl maleate, and other alkylhydroxyethyl maleates.

When the hydroxy-containing functional group polymerizable by actinic, gamma ray, or electron beam radiation (iii) component of the oligomer (a) is a vinyl ether, it will have the structure:

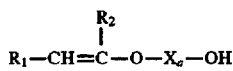

wherein $R_1$ and $R_2$ are monovalent radicals selected from the group consisting of hydrogen and alkyl groups having 1 to 10 carbon atoms, preferably from 1 to 4 carbon atoms. It is preferable that both $R_1$ and $R_2$ are not alkyl moieties, for in the case where both are lower alkyl groups this causes an undesirable reduction in polymerization rate of the oligomers of our invention. Where $R_1$ is an alkyl moiety it is preferred that $R_2$ be hydrogen, and conversely, where $R_1$ is hydrogen then $R_2$ should be an alkyl of 1 to 4 carbons. In a preferred embodiment either $R_1$ or $R_2$ is a methyl group and the other is hydrogen. In a still more preferred embodiment both $R_1$ and $R_2$ are hydrogen.

$X_a$ is a divalent radical having a molecular weight in the range of from 25 to about 500 and is independently selected from the group consisting of alkylene, arylene, aralkylene and cycloalkylene radicals. The hydroxy monovinyl ether (iii) can be viewed as the adduct of an alkyne and a diol and may be prepared in that way. However, they can also be made in other ways, and the method of producing them is not part of this invention. The alkyne has the generic formula $R_1C\equiv CR_2$, and the diol has the generic formula HO—X—OH.

Examples of the diols are alkylene glycols, $HO(C_nH_{2n})OH$, where n is an integer from 2 to about 10. The linear alkylene glycols, $HO(CH_2)_nOH$, (polymethylenediols), where n is an integer from 2 to about 10, are particularly useful, especially where n is from 2 to about 6. Illustrative of the members of this group are such diols as ethylene glycol, 1,3- propylene glycol, 1,4-butanediol, 1,5-pentanediol, 1,6-hexanediol, 1,7-heptanediol, 1,8-octanediol, 1,9-nonanediol, and 1,10-decanediol (decamethylene glycol).

The nonlinear or branched alkylene diols may also be used, where such glycols contain from 3 up to about 10 carbon atoms. Examples include 1,2-propylene glycol, 2,3-butanediol, 2,3-dimethyl-2,3-butanediol, 2,3-dimethyl-1,4-butanediol, 2,2- dimethyl-1,3-propanediol (neopentylglycol).

Another useful class of diols are the polyalkylene glycols, especially poly(ethylene) glycols, $HO[-CH_2CH_2O-]_mOH$, and poly(propylene) glycol, $HO[-CH(CH_3)CH_2O]_mOH$, where m is an integer from 1 up through about 50, although more usually m is an integer from 1 up to about 10, and most preferably from 1 up to about 5. Examples of these glycols include diethylene glycol, triethylene glycol, tetraethylene glycol, pentaethylene glycol, hexaethylene glycol, etc., along with the analogs of the propylene glycols.

Of particular importance is the case where $X_a$ is a divalent radical whose parent is a cycloalkane, such as cyclopentane, cyclohexane, cycloheptane, or cyclooctane, preferably the bis-hydroxy alkyl derivatives. The preferred diols are the 1,3-bis(hydroxyalkyl)cyclopentanes and the 1,4-bis-(hydroxyalkyl)cyclohexanes, -cycloheptanes, and -cyclooctanes, particularly the cyclohexanes. Diols substituted at positions different from those specified above may be used in the practice of this invention, but not necessarily with equivalent results. The bis(hydroxymethyl) cyclohexanes are preferred as they are readily available from the reduction of the corresponding phthalic acids, and among these 1,4-bis(hydroxymethyl)cyclohexane is favored.

Of the hydroxy monovinyl ethers (iii) which are produced by the reaction of acetylene with the diols described above, those which are especially preferred include 4-hydroxybutyl vinyl ether (HBVE), 4-hydroxymethyl cyclohexylmethyl vinyl ether (CHMVE), 2-hydroxy ethyl vinyl ether, triethylene glycol monovinyl ether, and diethylene glycol monovinyl ether.

Preferred structures for $X_a$ are the same as those listed for the polyester (i) above.

The urethane oligomer (a) may be formed by reacting the hydroxyl-terminated macropolyol (i) with the isocyanate compound (ii) or by reacting the isocyanate (ii) with the hydroxy-containing functional group polymerizable by actinic, gamma ray, or electron beam radiation (iii) and thereafter reacting the adduct with the remaining component or alternatively, the three components may be co-reacted. The ratios of (i), (ii), and (iii) will be chosen so that the ratio of the total number of hydroxyl groups from (i) and (iii) to the number of isocyanate groups from (ii) is about 1:1. The ratio of the number of hydroxyl groups from (i) to the number of hydroxyl groups from (iii) should be in the range from about 0.5 to 10.

An important characteristic of urethane oligomers (a) is that in all cases there are few hydroxyl groups derived from the macropolyol (i) or hydroxy-containing functional group polymerizable by actinic, gamma ray, or electron beam radiation (iii) in the final product. That is, less than about 10% of the initial hydroxyl groups remain unreacted. It is most preferable that the oligomeric product contain no detectable free hydroxyl groups, i.e., less than about 1% of the initial hydroxyl groups of the reactant mixture remain unreacted. It is also important that there should be essentially no free isocyanate groups remaining in the product, that is, less than about 1% of the initial isocyanate groups of the reactant mixture.

The reaction may be carried out at temperatures in the range of 0° C. to 150° C. Solvents such as diethyl ether, methylene chloride, or toluene may be employed and later removed from the oligomers, or the components may be reacted in the absence of solvents. Divinyl ether monomers such as 1,4-cyclohexane dimethanol divinyl ether or triethylene glycol divinyl ether may also be used as solvents. Such compounds may be obtained as by-products in the preparation of hydroxy monovinyl ethers. Since they have no free hydroxyl groups they do not react with the isocyanates, but may remain with the oligomers in the formulations of coatings.

The reaction may be carried out without a catalyst, however, any of the conventional catalysts may be used, e.g., dibutyl tin dilaurate.

Where the oligomer (a) comprises a polyester, it is the reaction product of (i) a polyol containing at least two terminal and/or pendant hydroxyl groups, (ii) a polybasic ester, and (iii) a hydroxy-containing functional group polymerizable by actinic, gamma ray, or electron beam radiation chosen from the group consisting of epoxy, acrylate, vinyl ether, maleate, or mixtures thereof. Examples of the polyol (i) structure are the hydroxyl-terminated polyether:

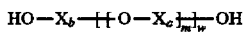

wherein $X_a$ and $X_b$ are radicals having a molecular weight of from 25 to about 500, and each $X_a$ and $X_b$ is independently selected from the group consisting of alkylene, arylene, aralkylene and cycloalkylene radicals, m is an integer from 0 to 100, preferably 1 to 10, and w is an integer from 0 to 3 indicating the number of additional substituents of $X_b$. Preferred structures for $X_a$ and $X_b$ are the same as those listed for the polyester (i) above.

An example of the polybasic ester (ii) structure is:

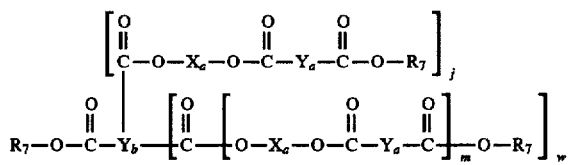

wherein $R_7$ is chosen from the group consisting of phenyl and an alkyl group containing from 1 to 6 carbons, $X_a$, $Y_a$, and $Y_b$ are radicals having a molecular weight of from 25 to about 500, each $X_a$, each $Y_a$, and $Y_b$ being independently selected from the group consisting of alkylene, arylene, aralkylene and cycloalkylene radicals, j is an integer from 0 to 2, m is an integer from 1 to 100, preferably 1 to 10, and w is an integer from 1 to 3. Preferred structures for $X_a$ are independently selected from the group consisting of:

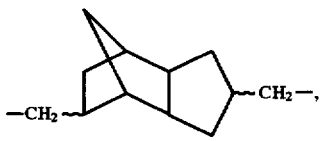

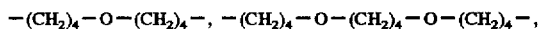

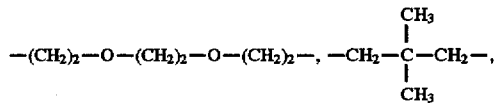

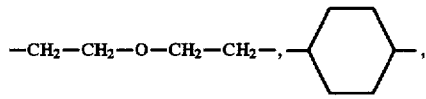

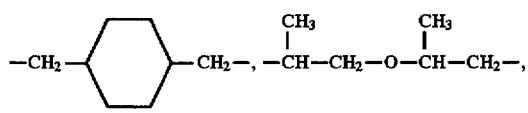

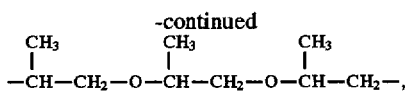

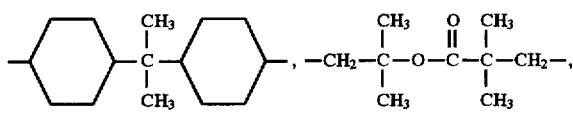

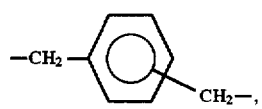

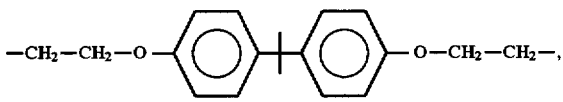

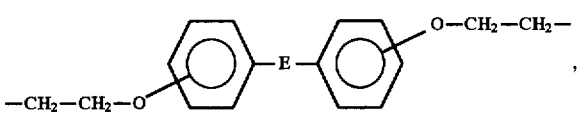

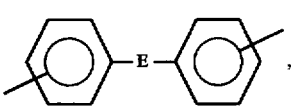

wherein n is an integer between 2 and 20, E is chosen from the group consisting of bond, O, $CH_2$, S, $SO_2$, $>C(CH_3)_2$, and $>C(CF_3)_2$. Preferred structures for $Y_a$ and $Y_b$ are those independently selected from the group consisting of:

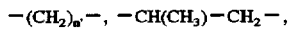

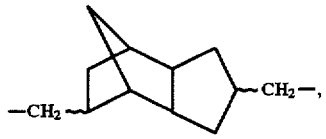

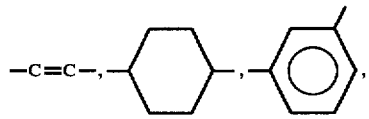

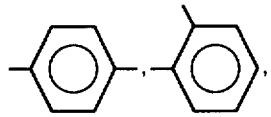

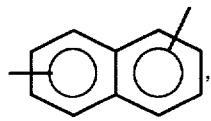

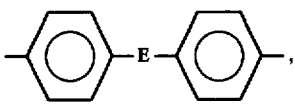

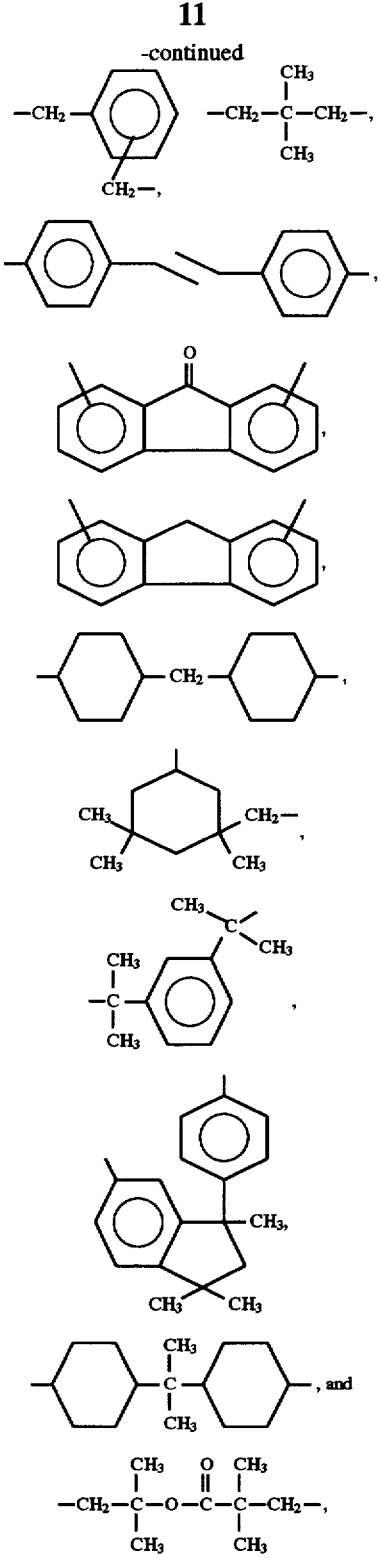

wherein n' is an integer between 2 and 20, E is chosen from the group consisting of bond, O, CH$_2$, S, SO$_2$, >C(CH$_3$)$_2$, and >C(CF$_3$)$_2$, and R$_y$ is chosen from the group consisting of hydrogen, alkyl containing from 1 to 6 carbon atoms, and NO$_2$, and Y$_b$ may additionally be chosen from the group consisting of:

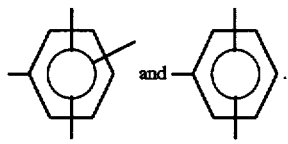

In a particularly preferred embodiment the polybasic ester is a dibasic ester, that is, m and j are zero and w is one.

Examples of the hydroxy-containing functional group (iii) are 1-hydroxy-2,3-epoxy propane, hydroxymethylcyclohexane-3,4-oxide, hydroxyethyl acrylate, hydroxypropyl acrylate, bis-hydroxyethyl maleate, methyl-2-hydroxymethyl maleate, and ethyl-2-hydroxymethyl maleate. Examples of the structure of (iii) are:

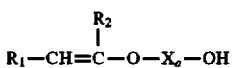

wherein R$_1$ and R$_2$ are monovalent radicals selected from the group consisting of hydrogen and alkyl groups having 1 to 10 carbon atoms. Preferably, R$_1$ is an alkyl group having 1 to 4 carbon atoms and R$_2$ is hydrogen or R$_1$ is hydrogen and R$_2$ is an alkyl group having 1 to 4 carbon atoms. Most preferably, both R$_1$ and R$_2$ are hydrogen. X$_a$ is a divalent radical having a molecular weight in the range of from 25 to about 500 and is independently selected from the group consisting of alkylene, cycloalkylene, and alkylene ether radicals. Preferred structures for X$_a$ are the same as those listed for the polyester (i) above.

Monomers (b)

In addition to the oligomer, the fiber optic coating of the instant invention also comprises monomers (b) which may be monofunctional monomers, multifunctional monomers, or a mixture of both monofunctional and multifunctional monomers. The monomers have a reactive functionality chosen from the group consisting of epoxy, acrylate, vinyl ether, maleate, or mixtures thereof, wherein at least one of (a) or (b) must contain a vinyl ether functionality. An example of a vinyl ether terminated ester monomer is:

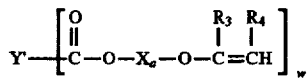

wherein w is an integer from 1 to 4 indicating the number of substitutents of Y', Y' is a mono-, di-, tri-, or tetrafunctional radical having a molecular weight of 15 to 500 and is independently selected from the group consisting of alkylene, arylene, aralkylene, and cycloalkylene radicals, X$_a$ is a divalent radical having a molecular weight of 25 to 500, each X$_a$ being independently selected from the group consisting of alkylene or cycloalkylene radicals, and R$_3$ and R$_4$ are monovalent radicals which are independently selected from the group consisting of hydrogen and alkyl groups having 1–10 carbon atoms, preferably independently selected from the group consisting of hydrogen and methyl. Y' is preferably selected from the group consisting of:

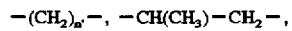

-continued

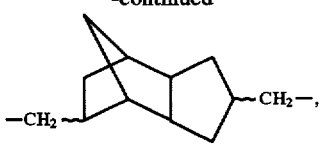
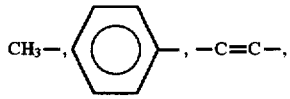
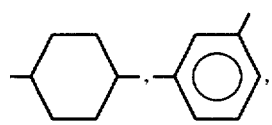
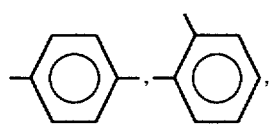
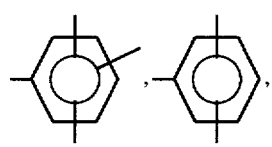
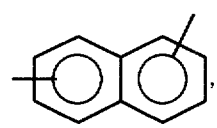
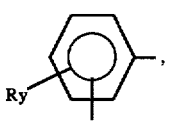
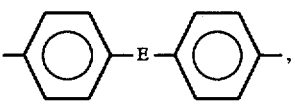
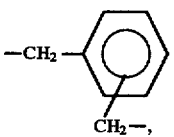
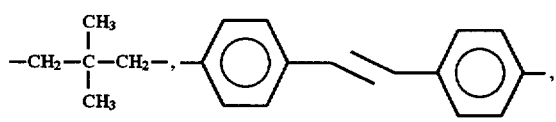
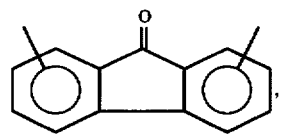
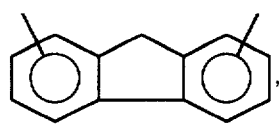

-continued

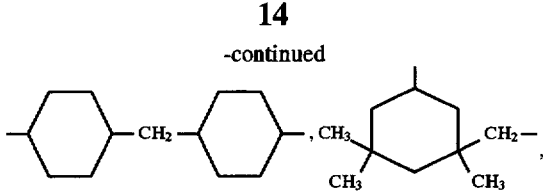
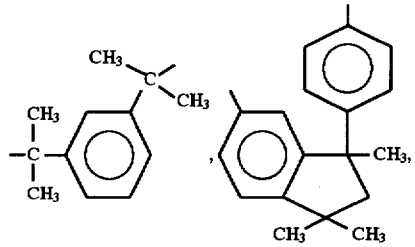
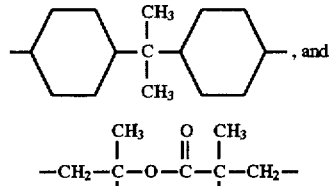
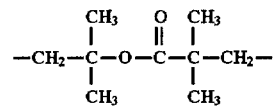

wherein n' is an integer between 2 and 20, E is chosen from the group consisting of bond, O, $CH_2$, S, $SO_2$, $>C(CH_3)_2$, and $>C(CF_3)2$, and $R_y$ is chosen from the group consisting of hydrogen, alkyl containing from 1 to 6 carbon atoms, and $NO_2$. Preferred structures for $X_a$ are the same as those listed for the polyester (i) above.

An example of a vinyl ether terminated ether monomer is:

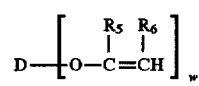

wherein w is an integer from 1 to 4 indicating the number of substituents of D, $R_5$ and $R_6$ are monovalent radicals which are independently selected from the group consisting of hydrogen and alkyl groups having 1–10 carbon atoms, preferably independently selected from the group consisting of hydrogen and methyl, and D is a mono-, di-, tri-, or tetravalent radical consisting of alkylene, cycloalkylene, or alkylene ethers having a molecular weight of 56 to 1000. Preferred structures for D are:

$-(CH_2)_n-$, $-CH(CH_3)-CH_2-$,

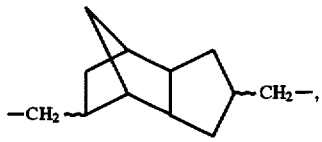

$-(CH_2)_4-O-(CH_2)_4-$, $-(CH_2)_4-O-(CH_2)_4-O-(CH_2)_4-$, $-(CH_2)_2-O-(CH_2)_2-O-(CH_2)_2-$,

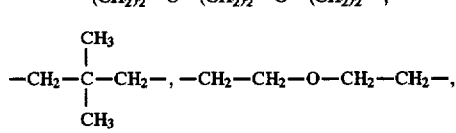

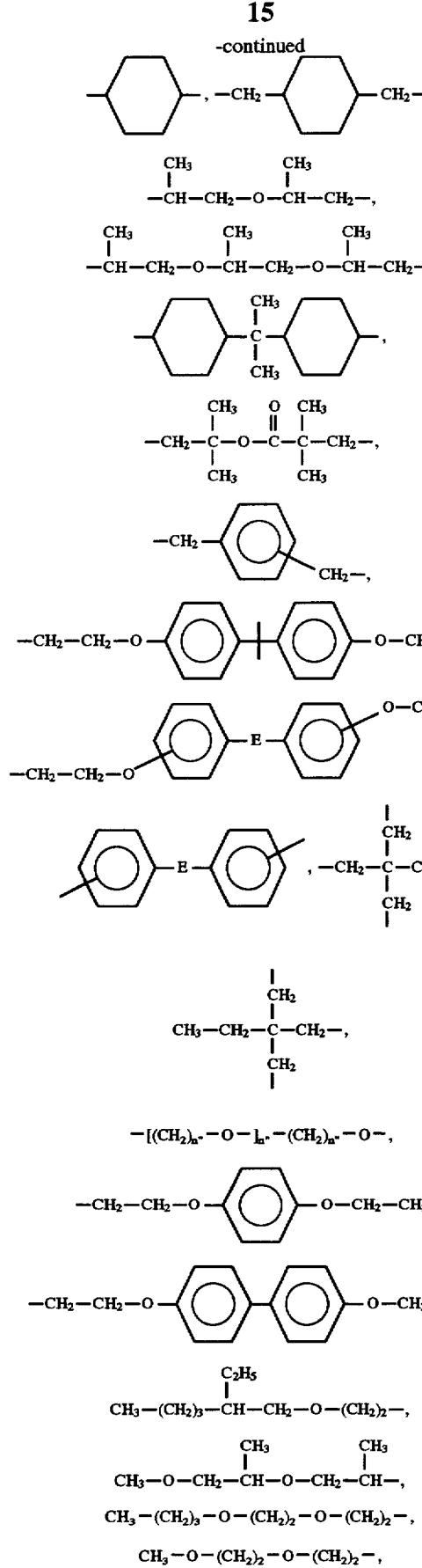

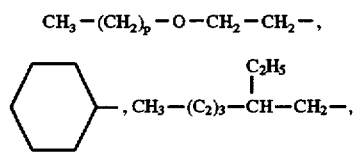

wherein n" is an integer from 1 to 8, p is the integer 3, 4, or 5, and E is chosen from the group consisting of bond, O, $CH_2$, S, $SO_2$, $>C(CH_3)_2$, and $>C(CF_3)_2$, and wherein the tricyclic structure above includes all stereoisomers. Typical divinyl ether compounds of particular usefulness are 1,4-cyclohexane dimethanol divinyl ether, dipropylene glycol divinyl ether, tripropylene glycol divinyl ether, triethylene glycol divinyl ether.

Such compounds may be prepared conveniently by reacting acetylene with diols such as 1,4-cyclohexane dimethanol, dipropylene glycol, tripropylene glycol, and diethylene glycol.

Monofunctional compounds may also be used and these may be prepared by reacting acetylene with monoalcohols such as cyclohexanol, diethylene glycol monobutyl ether, ethylene glycol monohexyl ether, dipropylene glycol monomethyl ether, and ethylene glycol-2-ethyl hexyl ether.

Typical monofunctional vinyl ethers include cyclohexyl vinyl ether, n-butyldiethoxy vinyl ether, n-hexylethoxy vinyl ether, methyl dipropylene glycol vinyl ether, and 2-ethylhexylethoxy vinyl ether.

Photoinitiator (c)

The photoinitiator (c) which may be chosen from the group consisting of a cationic photoinitiator and a radical photoinitiator, may be added with a sensitizer if necessary. Examples of cationic photoinitiators are triarylsulfonium salts or diaryliodonium salts having nonnucleophilic anions such as hexafluorophosphate (also known as Cyracure UVI-6990), hexafluoroantimonate (also known as UVI-6974), tetrafluoroborate, and hexafluoroarsenate. Examples of radical photoinitiators are benzoin ethers, acyl phosphine oxides, acyl ketals, and other radical photoinitiators known in the art. The photoinitators are usually required in amounts from about 0.1 to 5 wt. % in the blended formula of vinyl ethers and may comprise mixtures of different triarylsulfonium or diaryliodonium salts having different non-nucleophilic anions associated with them. Examples of sensitizers are benzophenone, thioxanthone, phenanthrene, anthracenemethanol, isopropylthioxanthone, and perylene. Radiation activated cationic initiators have been reviewed by J. V. Crivello, *Advances in Polymer Sci*, 64. pp. 1–48 (1984).

Thermal Oxidation Stabilizer (d)

The thermal oxidation stabilizer is present in the coating in an amount up to about 5 wt. %, preferably in the range of from about 0.25 wt. % to about 3.0 wt. %. Examples are hindered phenolic antioxidants such as octadecyl 3-(3',5'-di-tert-butyl-4'-hydroxyphenyl)propionate (Irganox 1076), tetrakis [methylene (3,5-di-tert-butyl-4-hydroxyhydrocinnamate)]methane (Irganox 1010), and benzene propanoic acid, 3,5-bis(1,1-dimethylethyl)-4-hydroxy-,thiodi-2,1-ethanediyl ester (Irganox 1035). Examples of stabilizers which are not hindered phenolic antioxidants are N,N'-(2-naphthyl)-phenylenediamine (AgeRite White) and p,p'-2-(2-phenylpropyldiphenylamine (Naugard 445).

Hydrogen Stabilizer (e)

The hydrogen stabilizer comprises one or more components chosen from the group consisting of hindered phenolic antioxidants, nitrogen-based stabilizers, aliphatic sulfides, aliphatic disulfides, aliphatic polysulfides, aromatic sulfides, aromatic disulfides, aromatic polysulfides, mixed aliphatic/aromatic sulfides, mixed aliphatic/aromatic disulfides, mixed aliphatic/aromatic polysulfides, aliphatic nitro compounds, and aromatic nitro compounds.

Examples of hindered phenolic antioxidants are Irganox 1076, 1010, and 1035 (see list of hindered phenolic antioxidants under (d) above for chemical formulas). Examples of nitrogen-based stabilizers are phenothiazine, carbazole, and hindered amine light stabilizers (HALS). Examples of aliphatic sulfides (R—S—R) are dodecyl sulfide, octyl sulfide, octadecyl sulfide, sec-octyl sulfide, and t-butyl sulfide. Examples of aliphatic disulfides (R—S—S—R) are dodecyl disulfide, octyl disulfide, octadecyl disulfide, sec-octyl disulfide, and t-butyl disulfide. Examples of aliphatic polysulfides are di-octyl polysulfide, di-t-dodecyl polysulfide, and di-t-nonyl polysulfide. Examples of aromatic sulfides (Ar—S—Ar) are phenyl sulfide, benzyl sulfide, tolyl sulfide, and 6-hydroxynaphthyl sulfide. Examples of aromatic disulfides (Ar—S—S—Ar) are phenyl disulfide, benzyl disulfide, tolyl disulfide, 6-hydroxynaphthyl disulfide, and a mixture of amylphenol disulfide polymers (Vultac 3, marketed by Atochem). Examples of aromatic polysulfides are benzyl trisulfide and phenyl trisulfide. Examples of mixed aliphatic/aromatic sulfides (Ar—S—R) are phenyl octyl sulfide, naphthyl octyl sulfide, and tolyl ethyl sulfide. Examples of mixed aliphatic/aromatic disulfides (Ar—S—S—R) are phenyl octyl disulfide, naphthyl octyl disulfide, and tolyl ethyl disulfide. Examples of aliphatic nitro compounds (R—$NO_2$) are nitromethane, 2-nitro-2-methyl-1-propanol, and 2-nitro-2-methyl-1,3-propanediol. Examples of aromatic nitro compounds (Ar—$NO_2$) are 5-nitroisophthalate esters. The hydrogen stabilizer may be present in the coating at a range of 0 to 5 wt. %.

Light Screen (f)

The light screen may be present in the coating at a range of 0 to 5 wt. %. Examples of light screens include benzotriazole derivatives and aromatic esters such as Cyasorb 2908 (2,6-di(t-butyl)-p-hydroxybenzoic acid, hexadecyl ester), aryl salicylate esters, and esters of 2-cyano-3,3-di-phenyl-acrylic acid.

Color Stabilizer (g)

The color stabilizer may be present in the coating at a range of 0 to 5 wt. %. Examples of color stabilizers are carbamates such as N,N'-dicarbomethoxybenzidine and blocked amines such as Tinuvin 440 (8-acetyl-3-dodecyl-7,7,9,9-tetramethyl-1,3,8-triazaspiro(4,5)decane-2,4-dione).

Blocking Stabilizer (h)

The blocking stabilizer is present in the secondary coating only at a range of 0 to 5 wt. %. of the secondary coating. Examples of blocking stabilizers are carnauba wax, polyether silicone copolymers such as SF 1188, fluorinated copolymers, micronized polyethylene waxes, and micronized celluloses.

Coupling Agent (j)

The coupling agent is used in the coating to promote adhesion of the coating with the substrate. In optical fiber coatings, coupling agents are used in the primary coating only and promote the adhesion of the primary coating with the glass fiber. Typical coupling agents are substituted trialkoxy silanes such as epoxypropyltrimethoxy silane, acryloxypropyltrimethoxy silane, allytriethoxysilane, and epoxycyclohexylethyltrimethoxy silane. The coupling agent may be present in the coating at a range of from 0 to 5 wt. %.

Coating Preparation

As discussed in the background, this invention relates to protective or decorative vinyl ether-based coatings for wood, metal, paper, glass, and plastics where it is important to maintain properties such as color stability, thermal stability, mechanical stability, hydrolytic stability, and resistance to embrittlement, and to minimize or prevent other properties such as hydrogen generation and blocking.

One such application requiring maintenance of such properties is the use of these coatings in optical fiber preparation. Optical coatings are usually applied in two layers, the inner being much different in physical properties than the outer. The inner or primary coating is sorer and more elastic than the outer or secondary coating, which is intended to provide a tough barrier able to protect the inner coating and the glass fiber beneath it. Although the formulations used by the present inventors for the inner and outer coatings are selected from the same families of vinyl ether compounds, quite different properties can be obtained. Also, it is an advantage to the formulator that both layers are chemically related in that cure, wettability, and adhesion are improved.

In general, the primary optical fiber coating comprises a vinyl ether-containing composition polymerizable by actinic, gamma ray, or electron beam radiation. This composition comprises a resin mixture, a photoinitiator, a thermal oxidation stabilizer, and additives, said resin mixture comprising oligomer (a) and monomers (b), wherein oligomer (a) comprises from about 50 to 90 wt % of the resin mixture and monomers (b) comprise about 5 to 50 wt % of the resin mixture, and wherein the mounts of the remaining components are based upon the resin mixture: the photoinitator (c) comprises from about 0.1 to 5 wt % based upon the weight of the resin mixture, the thermal oxidation stabilizer (d) comprises 0.1 to 5 pph, and the additives are a hydrogen stabilizer (e) comprising 0 to 5 pph, a light screen (f) comprising 0 to 5 pph, a color stabilizer (g) comprising 0 to 5 pph, and a coupling agent (j) comprising 0 to 5 pph.

The preferred primary optical fiber coating is characterized in that 85 wt % of the resin mixture comprises an oligomer (a) which is based upon 4-hydroxybutyl vinyl ether, dimethyl isophthalate, poly(tetrahydrofuran)diol having average molecular weights of 250 and 650, and 4,8-bis (hydroxymethyl)-tricyclo-[5.2.1.0$^{2,6}$]decane, and 15 wt % of the resin mixture comprises a monomer (b) which consists of the transesterification product of hydroxybutylvinyl ether and dimethyl isophthalate, said composition also containing 0.8 pph of a photoinitiator (c) consisting of a triarylsulfonium hexafluoroantimonate, 2 pph of a thermal oxidation stabilizer (d) consisting of octadecyl-3-(3',5'-di-tert-butyl-4'-hydroxyphenyl)propionate, 0.5 pph of a hydrogen stabilizer (e) consisting of dodecyl sulfide, and 0.5 pph of a coupling agent (j) consisting of allyltriethoxy silane.

The secondary optical fiber coating comprises a vinyl ether-containing composition polymerizable by actinic, gamma ray, or electron beam radiation. This composition comprises a resin mixture, a photoinitiator, a thermal oxidation stabilizer, and additives, said resin mixture comprising oligomer (a) and monomers (b), wherein oligomer (a) comprises from about 40 to 85 wt % of the resin mixture, monomers (b) comprise about 20 to 60 wt % of the resin mixture, and wherein the amounts of the remaining components are based upon the resin mixture: the photoinitator (c) comprises from about 0.1 to 5 wt % based upon the weight of the resin mixture, the thermal oxidation stabilizer (d) comprises 0.1 to 5 pph, and the additives are a hydrogen stabilizer (e) comprising 0 to 5 pph, a light screen (f) comprising 0 to 5 pph, a color stabilizer (g) comprising 0 to 5 pph, and a blocking stabilizer (h) comprising 0 to 5 pph.

The preferred secondary optical fiber coating is characterized in that 65 wt % of the resin mixture comprises an oligomer (a) which is based upon 4-hydroxybutyl vinyl ether, dimethyl isophthalate, and 4,8-bis(hydroxymethyl) tricyclo-[5.2.1.0$^{2,6}$]decane, and 35 wt % of the resin mixture comprises monomer (b) which consists of the transesterification product of hydroxybutylvinyl ether and dimethyl isophthalate, said composition also containing 0.8 pph of a photoinitiator (c) consisting of a triarylsulfonium hexafluoroantimonate, 2 pph of a thermal oxidation stabilizer (d) consisting of octadecyl-3-(3',5'-di-tert-butyl-4'-hydroxyphenyl)propionate, 0.5 pph of a hydrogen stabilizer (e) consisting of dodecyl sulfide, and 0.1 pph of a blocking agent (h) consisting of polyethersilicone copolymer.

The coatings and the oligomers are cured using actinic, gamma ray, or electron beam radiation. Electron beam curing may be performed advantageously in the presence of an iodonium or a sulfonium salt to afford high speed cationic polymerization. Ultraviolet curing in the presence of an onium salt also may be used to produce cationic polymerization. The ultraviolet radiation from a mercury vapor lamp is commonly used. Other means include thermal curing in the presence of a Lewis acid, such as boron trifluoride, or in the presence of a strong acid such as p-toluenesulfonic acid and trifluoromethylsulfonic acid. Latent thermal catalysts which release a strong acid upon heating, e.g., blocked sulfonic acid may also be used. All these methods of polymerization are well known to those skilled in the art. Cationic polymerization in the presence of ultraviolet radiation is preferred for curing of the coatings for optical fibers. Curing by radical polymerization may be induced by electron, gamma, or actinic radiation. Curing of a mixed vinyl ether/acrylate or vinyl ether maleate system in the presence of a radical initiator may be performed by ultraviolet, electron beam, or gamma irradiation. A dual initiator system, i.e., having both radical and cationic intitators, can also be used.

Finally, a stabilizer package for coatings may be made from the vinyl ether-containing mixture polymerizable by actinic, gamma ray, or electron beam radiation, said stabilizer package which comprises a thermal oxidation stabilizer and at least one additive chosen from the group consisting of a hydrogen stabilizer, a light screen, a color stabilizer, a blocking stabilizer, and a coupling agent.

EXAMPLE I

Oligomer synthesis

A vinyl ether urethane oligomer (a) comprising a urethane which is the reaction product of (i) a hydroxyl-terminated macropolyol, (ii) a diisocyanate, and (iii) a hydroxy monovinyl ether. The oligomer is synthesized by adding 1,4-cyclohexane dimethanol divinyl ether (CHVE, 160.6 grams) and 4,4'-diphenylmethane diisocyanate (MDI, 140.5 g, 0.56 mol) to a resin kettle which was heated to 50° C. under a dry nitrogen atmosphere. Hydroxy terminated poly(neopentyl adipate) (Witco Formrez 55-225, 138.9 g, 0.56 eq OH) was combined with 10 drops of dibutyltindilaurate and the mixture was added dropwise to the resin kettle over a period of about one hour while maintaining the reaction temperature between 50° and 60° C. 4-Hydroxymethyl cyclohexylmethyl vinyl ether (CHMVE), (95.4 g, 0.56 mol) was then added dropwise to the mixture. The reaction was followed by IR spectroscopy. After stirring the mixture at 55° to 60° for 2.5 hours, the IR band at 2250 cm−1 from the NCO group was no longer detectable. The product was a clear thick liquid. Gel permeation chromatography (GPC) (polystyrene standards) showed a weight average molecular weight Mn=2,000 and a number average molecular weight Mw=3,500.

EXAMPLE II

Coating formulations

Experimental coatings for optical fibers were developed by mixing (a) a vinyl ether terminated oligomer, (b) vinyl ether terminated ester and/or ether monomers which may be monofunctional monomers, multifunctional monomers, or a mixture of both monofunctional and multifunctional monomers, (c) a cationic photoinitiator, and (d) a thermal oxidation stabilizer, and also by adding additives comprising at least one additive chosen from the group consisting of: (e) a hydrogen stabilizer, (f) a light screen, (g) a color stabilizer, and (h) a blocking stabilizer or slip agent. The mixture was then cured under ultraviolet light. The relative mounts of each component are listed in the following Examples.

The problems with optical fiber coatings include long term stability, hydrogen generation, and blocking. Stabilizers to control these problems were tested and the data appear in the following Examples.

EXAMPLE III

Isothermal Ageing

The weight loss from stabilized and unstabilized primary and secondary cured films was measured during accelerated ageing. The primary coating comprised 69 wt. % Vectomer 2010 (a vinyl ether urethane oligomer), 9 wt. % poly(THF) DVE (an experimental divinyl ether sold by BASF), 10 wt. % 4-vinyloxybutylbenzoate, 12 wt. % hexylethoxyvinylether, and 0.5 pph UVI-6990 (a cationic photoinitiator). The secondary coating comprised 20 wt. % VEctomer 4010 (a vinyl ether ester monomer), 38 wt. % VEctomer 2031 (a vinyl ether urethane oligomer), 14 wt. % CHVE "Rapi-cure" (a cyclohexane dimethyl divinyl ether sold by ISP), 28 wt. % VEctomer 4020 (a vinyl ether ester monomer), and 0.75 pph UVI-6990. The stabilized primary and secondary coatings also contained 1 pph Irganox 1076 (a hindered phenol antioxidant). The films were between 76–152 μm (3–6 mil) thick. The films were cured on glass at a UV dose of 500 mJ/cm$^2$ and then aged at 120° C. with periodic monitoring of weight loss. Data appear in Tables 1 and 2.

TABLE 1

Isothermal Ageing of Primary Coatings

| | % Weight Loss | | | | | |
|---|---|---|---|---|---|---|
| Stabilizer | 0.5 h | 1 h | 3 h | 7 h | 25 h | 48 h |
| none | 4.0 | 6.1 | 8.9 | 10.7 | 13.4 | 14.8 |
| 1 pph | 4.8 | 5.1 | 5.6 | 6.0 | 6.7 | 7.1 |

TABLE 2

Isothermal Ageing of Secondary Coatings

| | % Weight Loss | | |
|---|---|---|---|
| Stabilizer | 1 h | 100 h | 300 h |
| none | 2.6 | 3.2 | 7.0 |
| 1 pph Irganox 1076 | 2.2 | 2.7 | 4.0 |

The data in Tables 1 and 2 show that Irganox 1076, a hindered phenol antioxidant, is effective in reducing weight loss relative to unstabilized systems in both the primary and secondary coatings.

DMA (Dynamic Mechanical Analysis)

The stability of the coatings was also tested by measuring the change in glass transition temperature by DMA after the coatings were coated on glass, cured with a UV dose of about 450 mJ/cm$^2$, peeled off the glass, and then aged in air in an oven at 85° C. Samples were taken over a period of 30 days. Scans were run at 3.5 Hz at a heating rate of 1° C./minute. Primary and secondary coatings containing Irganox 1076 were tested and it was found that within experimental error (±3° C.) the Tg had not changed.

The results from isothermal ageing of these vinyl ether based stabilized coatings are favorably comparable to existing acrylate based optical fiber coatings.

EXAMPLE IV

Stabilizers to Prevent Hydrogen Generation

Another problem with fiber optic coatings is hydrogen generation. Coatings containing a phenolic antioxidant stabilizer were screened for hydrogen generation and compared to an unstabilized coating. The coatings were prepared by applying a formulation of two vinyl ethers, 75 wt. % VEctomer™ 2010 (a vinyl ether urethane oligomer), 25 wt. % of either hexylethoxyethoxyvinylether (HEEVE) or butylethoxyethoxyvinylether (BEEVE), and 1 pph of the cationic photoinitiator, UVI-6990. The formulations were drawn into films with a thickness of approximately 76 µm (3 mil) and cured using 250 mJ/cm$^2$ UV exposure. The films were heat aged for 48 hours at 100° C. in sealed vessels previously flushed with nitrogen and the headspace was then analyzed for hydrogen. The analysis was performed using size exclusion gas chromatography with thermal conductivity detection. The detection threshold was less than 0.5 µL/g. The results, as shown in Table 3 below, demonstrate that phenolic antioxidant stabilizers are effective in lowering the generation of hydrogen.

TABLE 3

Hydrogen Generation in Vinyl Ether Coatings

| Ethoxyvinylether | Cure Dose (mJ/cm$^2$) | Irganox 1076 | H$_2$ Generated (uL/g) |
|---|---|---|---|
| HEEVE | 250 | none | 8.7 |
| HEEVE | 250 | 1 pph | 1.4 |
| BEEVE | 250 | none | 7.5 |
| BEEVE | 250 | 1 pph | 1.4 |
| BEEVE | 500 | none | 8.6 |

Continued testing demonstrated that structurally similar hindered phenols, i.e., Irganox 1010 and 1035, gave similar results.

EXAMPLE V

The primary and secondary coatings of Example III were prepared with 1 pph Irganox 1076. These coatings had enhanced low temperature characteristics and thermal stability and achieved a nearly ten-fold reduction in hydrogen generation. The results of the hydrogen generation tests appear in Table 4.

TABLE 4

Hydrogen Generation in VEctomer™ Fiber Optic Coatings

| Coating | H$_2$ (µL/g) |
|---|---|
| Primary | 4.9 |
| Secondary | 5.2 |

EXAMPLE VI

Effect of Nitrogen Based Stabilizers

With the knowledge that (1) phenolic anti-oxidant stabilizers are effective but not sufficient to reduce hydrogen generation (Example IV), (2) complete cure is critical to coating properties, and (3) amines and many nitrogen based compounds inhibit cationic curing of vinyl ethers, the effect of commercial amine based stabilizers as well as model compounds on coating cure behavior was studied. We chose to include several hindered amines which are Tinuvin derivatives based on 2,2,6,6-tetramethylpiperidine. The selection included a secondary amine (Tinuvin 770), tertiary amine (Tinuvin 292), iminoether (Tinuvin 123) and amide (Tinuvin 440). Phenothiazine was also included in the study as secondary aromatic amines have been used as antioxidants in polymers. Also included were two carbamate derivatives synthesized in our laboratories. The alkyl substituted carbamate moiety is known to allow full cure when part of a polyurethane structure. Finally, Tinuvin 1130, a commercial UV light screen based upon benzotriazole, was included. The compounds were added to a control formulation comprising 69 wt. % Vectomer 2010, 9 wt. % poly (THF)DVE (an experimental divinyl ether sold by BASF), 10 wt. % 4-vinyloxybutylbenzoate, 12 wt. % hexylethoxyvinylether, and 0.5 pph UVI-6990 (a cationic photoinitiator), and tested for curing at 250 mJ cure dose. The control sample cures fully at this dose. The results are shown in Table 5.

TABLE 5

Effect of Nitrogen Based Stabilizers on Vinyl Ether Curing

| Sample | Irganox 1076 | Amine Stabilizer | Cure Inhibition |
|---|---|---|---|
| Primary Control | none | none | none |
| Primary | 1 pph | none | none |
| Primary | 1 pph | N,N-diisopropyl-t-butyl carbamate (1 pph) | none |
| Primary | 1 pph | N,N-dibenzyl-t-butyl carbamate (1 pph) | none |
| Primary | 1 pph | Tinuvin 770 (1 pph) | cure inhibited |
| Primary | 1 pph | Tinuvin 292 (1 pph) | cure inhibited |
| Primary | 1 pph | Tinuvin 123 (1 pph) | cure inhibited |
| Primary | 1 pph | Phenothiazine (1pph) | none, dark red color upon heat aging |
| Primary | 1 pph | Tinuvin 440 (1 pph), HALS | mild inhibition |
| Primary | 1 pph | Tinuvin 1130 (1 pph), light screen | cure inhibited |

The commercially available Tinuvin HALS do not allow proper curing in a cationically-cured vinyl ether system. Tinuvin 440, the amide protected HALS, allows curing of the films with mild inhibition. The Tinuvin 1130 ultraviolet screen hinders the coating cure and the samples discolor upon curing and become even darker on heat ageing. The carbamate protected amines are the best performers in this test. They do not hinder cure and actually decrease discoloration of the samples on heat ageing.

EXAMPLE VII

Other Nitrogen-Based Stabilizers

The two carbamates, N,N-diisopropyl-t-butylcarbamate, and N,N-dibenzyl-t-butylcarbamate, and phenothiazine which allowed proper cationic curing of vinyl ethers were screened as well as carbazole, a secondary aromatic amine structurally similar to phenothiazine. In addition, the carbamate protected HALS analog 2,2,6,6-tetramethyl-N-carbomethoxypiperidine, triphenyl phosphite (which has been used in polyester systems) as an antioxidant, and Cyasorb 2908 were included in the screening. The primary formulation of Example V, which contains Irganox 1076 (1 pph), was used as a master batch and spiked with the stabilizers. Curing, thermal ageing, and hydrogen analysis resulted in the data in Table 6. The hydrogen generation data are the average of two tests.

TABLE 6

Hydrogen Generation in Multi-Component Stabilized Fiber Optic Coatings

| Formulation | Added Stabilizers | Color Stability[1] (100° C., 48 hrs) | $H_2$ Generated $(\mu L/g)$[2] |
|---|---|---|---|
| Primary | None | 3 light yellow | 3.5 |
| Primary | Cyasorb UV-2908 (1pph) | 4 yellow | 3.6 |
| Primary | Phenothiazine (1pph) | 5 light brown | 0.6 |
| Primary | N,N-dibezyl-tert-butyl caramate (1pph) | 2 light yellow | 1.9[3] |
| Primary | N,N-diisopropyl-tert-butyl carbamate (1pph) | 1 pale yellow | 2.2 |
| Primary | Carbazole | 4 yellow | 2.5 |
| Primary | Phenothiazine (0.5pph) + N,N-diisopropyl-tert-butyl carbamate (0.5pph) | 1 pale yellow | 0.4 |
| Primary | 2,2,6,6-tetramethyl-N-carbomethoxy piperidine | NA | 3.9[3] |
| Primary | triphenyl phosphate | NA | No Cure |

1) Color ratings based upon visual observations.
   Least colored = 1
   Most colored = 5
2) Average of two experiments one week apart using same formulations.
3) Formulation would not cure after ageing one week.

The stabilizer packages affect the coloration characteristics of the coatings upon heat aging. Phenothiazine, greatly increases discoloration. This would be a problem as the fiber optic coatings must not interfere with a color coded top-coat used for cabling purposes. Conversely, formulations containing carbamates have very little discoloration. The phenothiazine discoloration issue may be addressed utilizing a multiple stabilizer package. Entry 7 in Table 6 (phenothiazine at 0.5 pph) demonstrates that a combination package containing Irganox 1076, phenothiazine and a carbamate provides excellent color and hydrogen stabilization. The results demonstrate that multiple component stabilizer packages can be more effective in lowering the hydrogen generation and providing color stability in these systems than are the single component systems.

EXAMPLE VIII

Other Hydrogen Stabilizers

Other compounds shown to have stabilization activity are displayed in Table 7. These are both nitrogen- and sulfur-based materials.

TABLE 7

Hydrogen Generation With Phenothiazine-Like Derivatives

| Sample | Stabilizer (0.5pph) | Hydrogen Generated $(\mu L/g)$ |
|---|---|---|
| Primary | None | 2.3 |
| 1 | Phenothiazine | 0.1 |
| 2 | Dibenzothiophene | 1.2 |
| 3 | N,N'-Diphenylbenzidine | 0.9 |
| 4 | Phenoxazine | 0.5 |
| 5 | Thianthrene | 2.2 |

EXAMPLE IX

Stabilizer Loading

A study was performed to ascertain the level of phenothiazine needed to effectively reduce hydrogen generation. In this case, both the primary and secondary coatings were used in the test. The primary coating comprised 69 wt. % Vectomer 2010, 9 wt. % poly(THF)DVE, 10 wt. % 4-vinyloxybutylbenzoate, 12 wt. % hexylethoxyvinylether, and 0.5 pph UVI-6990 (a cationic photoinitiator). The secondary coating comprised 43 wt. % VEctomer 2032 (a vinyl ether urethane oligomer), 20 wt. % VEctomer 4010, 28 wt. % VEctomer 4020, 8 wt. % CHVE "Rapi-cure," and 0.75 pph UVI-6990. The stabilized primary and secondary coatings also contained 1 pph Irganox 1076. Phenothiazine was also added in varying amounts: 0, 0.1, 0.25 and 0.5 pph. The samples were cured and analyzed as above. The results are shown in Table 8.

TABLE 8

Effect of Phenothiazine Loading on Hydrogen Generation

| Formulation | Phenothiazine Content (pph) | Hydrogen Generation $(\mu L/g)$ |
|---|---|---|
| Primary | None (control) | 5.7 |
| Primary | 1.00 | 0.6 |
| Primary | 0.50 | 0.7 |
| Primary | 0.25 | 0.8 |
| Primary | 0.10 | 1.5 |
| Secondary | None (control) | 5.3 |
| Secondary | 0.50 | 3.7 |
| Secondary | 0.25 | 3.6 |
| Secondary | 0.10 | 4.0 |

As seen in Table 8, phenothiazine is effective in reducing hydrogen generation in both coatings at loadings as low as 0.1 pph. While there is some benefit in using loadings as high as 1 pph, a good balance of hydrogen generation, cure response and minimum discoloration is obtained at 0.25 pph.

EXAMPLE X

Stabilizers to Prevent Blocking

A number of stabilizers were screened to determine their effectiveness in reducing blocking in the vinyl ether based optical fiber coatings. Requirements for the stabilizers included solubility in the uncured system, no interference with cationic curing and minimal changes in the formulation properties (other than blocking). The stabilizers were formulated with our secondary coating and cured on glass plates under nitrogen. The coatings were cut into 1.5–2.0" strips and carefully arranged into "stacks" which were pressed together by a 200 gram weight. After waiting about 24 hours, the tack and coefficient of friction were analyzed. The results are compiled in Table 9.

TABLE 9

Performance of Blocking Stabilizers

| Stabilizer | 3.0% | 2.0% | 1.0% | 0.5% | 0.375% | 0.25% |
|---|---|---|---|---|---|---|
| Control | B | | | | | |
| stearic acid | 3 | B | B | | | |
| Amberwax 195 | NC | NC,H | 1 | 1 | | H,2 |
| Allied A-C 617 | NC | NC | NC,3 | | | |
| Acrawax C | NC | | | | | |
| Paraffin 5055 | NC | NC,H | NC,H | | | |
| Amberwax 175 | | | H,B | 2 | | H,B |
| Allied A-C 580 | | | 3 | | | |
| Allied A-C 680 | | | NC,B | | | |
| Allied A-C 400 | | | NC,3 | | | |
| Allied A-C 405 T | | | NC | | | |
| Allied A-C 1702 | | | NC,2 | | | |
| carnauba wax | | | H,2 | H,1 | H,1 | H,3 |
| SF 1188 | | | | 1 | 1 | |
| stearamide | | | | NC,1 | | NC |

NC - Not Compatible
B - Blocked
H - Hazy
1 - No Blocking, Very low coefficient of friction
2 - No Blocking, Low coefficient of friction
3 - No Blocking, High coefficient of friction As seen in Table 9, three candidates, Amberwax 195, carnauba wax, and SF 1188, were found to reduce blocking very efficiently. The carnauba wax imparted a slight haze to the formulation indicating marginal solubility. The Amberwax 195 was incompatible at high loadings, but was completely miscible at low loadings.

EXAMPLE XI

Polyesters

A polyester oligomer based upon a polyol and diester was formed utilizing standard polyester conditions. The stoichiometry was controlled such that the oligomer was ester end-capped and of the appropriate molecular weight. A second stage was then performed in which hydroxyvinyl ether was added to end-cap the ester moieties.

The polyester oligomer was synthesized as follows: A 250 mL high temperature polycondensation flask equipped with a short path distillation sidearm was charged with 4,8-bis (hydroxymethyl)tricyclo-[5.2.1.0$^{2,6}$]decane (BHTD, 39.26 g, 0.2 mol), dimethyl isophthalate (DMI) (58.26 g, 0.3 mol) and titaniumdiisopropoxide acetylacetonate catalyst (10 drops). The flask was fitted with a mechanical stirrer and vacuum applied (23.9 kPa, 180 torr). The mixture was stirred at 140° C. for 180 minutes during which time methanol (9.8 g, 77% theory) distilled from the reaction. The reactor vacuum was dropped to <667 Pa (<5 torr) over 120 minutes during which time an additional 2.4 g methanol was collected (95% theory). Hydroxybutylvinyl ether (HBVE, 35 g, 0.3 mol) was added to the reaction mass and stirring at 140° C./12 kPa (90 torr) was continued for 70 minutes. The vacuum was subsequently lowered to 5.3 kPa (40 torr) over 45 minutes. A total of 6.3 g methanol distilled during the HBVE condensation stage (98% theory). The vacuum was lowered to <667 Pa (<5 torr) and excess HBVE removed. A total of 11.5 g HBVE (98% theory) was recovered. The mixture was cooled to room temperature and used without purification. FTIR shows no OH stretch and gel permeation chromatography (GPC) (ethyl acetate solvent, polystyrene standards with UV detection at 270 nm, flow rate was 1.0 mL/min at 35° C., refractive index (RI) detection) gave molecular weights of Mn=2,183, Mw=2,268. using four columns with 5 μm diameter particles having pore sizes of 50 Å, 100 Å, 500 Å, and 1000 Å, respectively. HNMR analysis indicated no acetal formation.

EXAMPLE XII

Polyester Coatings

The oligomer of Example XI was formulated with various additives as a secondary optical fiber coating. The formulations were 60% oligomer and 40% VEctomer 4010 (a vinyl ether ester monomer), with 0.5 pph of the photoinitiator UVI-6974 (hexafluoroantimonate). The additives for each sample and the hydrogen generation data appear in Table 11. The formulations were drawn down into 1.5 mil films, then cured using 300 mJ/cm$^2$ UV exposure (H bulbs). The films were then heat aged at 100° C. for 48 hours in containers sealed in air. GC head space analyses were then conducted, and the amount of hydrogen generated was determined in μL/g of cured coating.

TABLE 11

HYDROGEN STABILIZATION DATA

| SAMPLE | ADDITIVES | H$_2$ GENERATION |
|---|---|---|
| 1 | none | 54–74 uL/g |
| 2 | 1 pph Irganox 1076 | 12–17 |
| 3 | 1 pph Vultac 3$^1$ | 39–45 |
| 4 | 1 pph Irganox 1076<br>1 pph Vultac 3 | 2.5–5.4 |
| 5$^2$ | 1 pph 6-hydroxy-4-naphthyldisulfide | 4.7–6.2 |
| 6$^2$ | 1 pph Irganox 1076<br>1 pph 6-hydroxy-4-naphthyl-disulfide | 2.2–4.2 |
| 7 | 1 pph TPS$^3$ | 55–66 |
| 8 | 1 pph Irganox 1076<br>1 pph TPS | 14–17 |
| 9 | 1 pph phenyl-disulfide | 12–18 |
| 10 | 1 pph Irganox 1076<br>1 pph phenyl-disulfide | 3.3–6.7 |
| 11 | 1 pph Irganox 1076<br>1 pph p-tolyl-disulfide | 3.3–5.0 |
| 12 | 1 pph Irganox 1076<br>1 pph benzyl-disulfide | 4.1–5.3 |
| 13 | 1 pph Irganox 1076<br>1 pph benzyl-trisulfide | 5.1–7.2 |

$^1$Vultac 3 is a mixture of amylphenol disulfide polymers marketed by Atochem.
$^2$In order to achieve full cure, the cure dose used on this sample was 600 mJ/cm$^2$ rather than 300 mJ/cm$^2$.
$^3$TPS 27 is a sulfur-containing compound marketed by Atochem for use as an extreme pressure additive for lubricating oil formulations.

The data show synergistic effects of using combinations of hindered phenols and organo-sulfur compounds for hydrogen generation. The effects are not simply additive as may be seen, for example, by comparing the results of Samples 2 and 3 with those of Sample 4.

EXAMPLE XIII

A polyester oligomer containing two polyols and a diester was formed utilizing standard polyester conditions. The stoichiometry was controlled such that the oligomer was ester end-capped and of the appropriate molecular weight. A second stage was then performed in which hydroxyvinyl ether was added to end-cap the ester moieties.

The polyester oligomer was synthesized as follows: A 250 mL high temperature polycondensation flask equipped with a short path distillation sidearm was charged with 4,8-bis(hydroxymethyl)tricyclo-[5.2.1.0$^{2,6}$]decane (BHTD, 58.9 g, 0.3 mol), dimethyl isophthalate (DMI) (213.6 g, 1.1 mol), poly(tetrahydrofuran)diol 250 (164.7 g, 0.7 mol) and titaniumdiisopropoxide acetylacetonate catalyst (10 drops). The flask was fitted with a mechanical stirrer and vacuum applied (10 kPa, 75 torr). The mixture was stirred at 120° C. for 180 minutes during which time methanol (58.4 g, 91% theory) distilled from the reaction. The reactor vacuum was dropped to <667 Pa (<5 torr) over 70 minutes during which time an additional 62 g methanol was collected (96.6% theory). Hydroxybutylvinyl ether (HBVE, 39.6 g, 0.34 mol) was added to the reaction mass and stirring at 120° C./9.3 kPa (70 torr) was continued for 75 minutes. The vacuum was subsequently lowered to 6.0 kPa (45 torr) over 180 minutes. A total of 4 g methanol distilled during the HBVE condensation stage (63% theory). The vacuum was lowered to <667 Pa (<5 torr) and excess HBVE removed. A total of 17.7 g HBVE (104% theory) was recovered. The mixture was cooled to room temperature and used without purification. FTIR shows no OH stretch and gel permeation chromatography (GPC) (ethyl acetate solvent, polystyrene standards with UV detection at 270 nm, flow rate was 1.0 mL/min at 35° C., refractive index (RI) detection) gave molecular weights of Mn=2,183, Mw=2,268. using four columns with 5 μm diameter particles having pore sizes of 50 Å, 100 Å, 500 Å, and 1000 Å, respectively. HNMR analysis indicated no acetal formation. The mol ratio of the components in the oligomer was 2:11:7:3 HBVE/DMI/THF250/BHTD.

EXAMPLE XIV (Comparative)

A polyester oligomer containing the polyols and diester of Example XIII was prepared as before with the exception that cyclohexane dimethanol (CHDM) was substituted for BHTD. The product of the reaction contained the following mol ratios 2:11:8:2 HBVE/DMI/THF250/CHDM.

EXAMPLE XV

The oligomers of Examples XIII and XIV were mixed with Vectomer 4010 (a monomer which is the reaction product of dimethyl isophthalate (DMI) and 4-hydroxybutyl vinyl ether (HBVE)) in a weight ratio of 75% oligomer and 25% VEX4010. The mixtures were cured by irradiating with 250 mJ/cm$^2$ with an RPC model QC-1202 ultraviolet processor. The cured films were measured for their physical properties in an Instron Model 4502 tester with the following results:

|  | Ex. XII | Ex. XIV |
|---|---|---|
| Elongation | 61% | 29% |
| Modulus | 710 psi | 493 psi |
|  | (4,895 kPa) | (3,399 kPa) |

This comparison illustrates the effect of using BHTD as a polyol to chain extend the ester, namely a polymer having greater elongation and strength is obtained.

EXAMPLE XVI

Comparative

The procedures of Example XIII, XIV, and XV were repeated but polyTHF 250 was not included and the proportions of the components were varied so as to produce a stronger polymer. The results are given in the following table.

| Components (mol ratio) | wt. % | Elongation | Modulus |
|---|---|---|---|
| HBVE/DMI/BHTD/CHDM (2:3:1.33:0.33) | 60 | 28% | 168,948 psi |
| Vex 4010 | 40 |  | (1,165 MPa) |
| HBVE/DMI/BHTD (2:3:2) | 60 | 48% | 126,353 psi |
| Vex 4010 | 40 |  | (871 MPa) |

In this example, replacing the minor proportion of CHDM with BHTD improved elongation, but resulted in a reduction in modulus, although it was sufficient for use in optical fiber coatings.

EXAMPLE XVII (Comparative)

An oligomer was produced following the general procedures of Examples XIII in which no BHTD was included. The oligomer consisted only of dimethyl isophthalate (DMI) reacted with cyclohexane dimethanol (CHDM) and thereafter end-capped with 4-hydroxy butyl vinyl ether (HBVE). The mol ratio of the components were 2:3:2 HBVE/DMI/CHCM. When this oligomer was mixed with VEctomer 4010 (reaction product of DMI and HBVE) it was found that the oligomer and the monomer 4010 were not mutually soluble; a pasty mixture was formed. Consequently, curing of the mixture was not attempted.

EXAMPLE XVIII

An oligomer was produced using the general procedures of Example XIII, but instead of poly (tetrahydrofuran) diol 250, hydrogenated bisphenol A (HBPA) was included. The mol ratio of the components were 2:3:1:1 HBVE/DMI/BHTD/HBPA. A mixture of 65 wt. % oligomer plus 35 wt. % of Vectomer 4010 was cured and the physical properties measured as in Example XV. The cured product had an elongation of 15% and a modulus of 139,693 (963 MPa). It was concluded that the cyclic diol HBPA does not improve elongation compared to BHTD alone, as shown in Example XVI.

What is claimed is:

1. A vinyl ether terminated polyester oligomer consisting essentially of the reaction product of:

(a) a polybasic ester having the structure

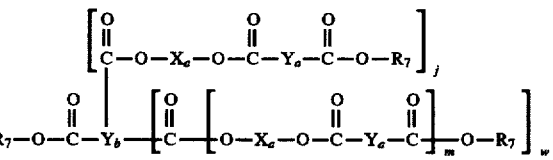

wherein R$_7$ is chosen from the group consisting of phenyl and an alkyl group containing from 1 to 6 carbons, X$_a$, Y$_a$, and Y$_b$ are radicals having a molecular weight of from 25 to about 500, each X$_a$, each Y$_a$, and Y$_b$ being independently selected from the group consisting of alkylene, arylene, aralkylene and cycloalkylene radicals, j and m are 0 and w is 1;

(b) 4,8-bis(hydroxymethyl)tricyclo-[5.2.1.0$^{2,6}$]-decane (BHTD);

(c) a hydroxy monovinyl ether having the structure

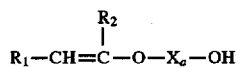

wherein $R_1$ and $R_2$ are monovalent radicals selected from the group consisting of hydrogen and alkyl groups having 1 to 10 carbon atoms, and $X_a$ is a divalent radical having a molecular weight in the range of from 25 to about 500 and is selected from the group consisting of alkylene, cycloalkylene, and alkylene ether radicals.

2. A vinyl ether terminated polyester oligomer of claim 1 wherein the polybasic ester (a) is dimethyl isophthalate and the hydroxy monovinyl ether (c) is 4-hydroxy butyl vinyl ether.

3. A vinyl ether terminated polyester oligomer of claim 1 further comprising a di-functional polyol other than BHTD.

4. A vinyl ether terminated polyester oligomer of claim 3 wherein said difunctional polyol is poly(tetra-hydrofuran) diol.

5. A vinyl ether terminated polyester oligomer of claim 3 wherein said difunctional polyol is cyclohexane dimethanol (CHDM).

* * * * *